United States Patent
Fan et al.

(10) Patent No.: US 9,787,415 B2
(45) Date of Patent: Oct. 10, 2017

(54) TRANSMITTER LO LEAKAGE CALIBRATION SCHEME USING LOOPBACK CIRCUITRY

(71) Applicant: Analog Devices, Inc., Norwood, MA (US)

(72) Inventors: Jianxun Fan, Apex, NC (US); Reza Alavi, Belle Meade, NJ (US); Steven R. Bal, Cary, NC (US); David J. McLaurin, Durham, NC (US)

(73) Assignee: ANALOG DEVICES, INC., Norwood, MA (US)

( * ) Notice: Subject to any disclaimer, the term of this patent is extended or adjusted under 35 U.S.C. 154(b) by 219 days.

(21) Appl. No.: 13/826,365

(22) Filed: Mar. 14, 2013

(65) Prior Publication Data

US 2014/0269863 A1 Sep. 18, 2014

(51) Int. Cl.
- *H04B 17/11* (2015.01)
- *H04B 1/52* (2015.01)
- *H04B 15/04* (2006.01)
- *H04B 1/525* (2015.01)

(52) U.S. Cl.
CPC ............. *H04B 17/11* (2015.01); *H04B 1/525* (2013.01); *H04B 15/04* (2013.01)

(58) Field of Classification Search
None
See application file for complete search history.

(56) References Cited

U.S. PATENT DOCUMENTS

| | | | |
|---|---|---|---|
| 3,449,696 A * | 6/1969 | Routh | 333/132 |
| 4,785,270 A * | 11/1988 | Kinsman | 333/193 |
| 5,332,983 A * | 7/1994 | Peach | 333/193 |
| 6,229,992 B1 * | 5/2001 | McGeehan et al. | 455/78 |
| 6,960,962 B2 | 11/2005 | Peterzell | |
| 7,280,805 B2 | 10/2007 | Xu | |
| 7,856,048 B1 | 12/2010 | Smaini | |
| 8,135,348 B2 | 3/2012 | Aparin | |
| 8,331,502 B1 * | 12/2012 | Nabar et al. | 375/344 |

(Continued)

FOREIGN PATENT DOCUMENTS

| | | |
|---|---|---|
| EP | 1 841 058 | 7/2011 |
| WO | 2008/005421 A2 | 1/2008 |

OTHER PUBLICATIONS

Wikipedia, Lattice filter, practical design, 2008 http://en.wikipedia.org/wiki/File:Lattice_filter,_practical_design.svg.*

(Continued)

*Primary Examiner* — Ping Hsieh
*Assistant Examiner* — James Yang
(74) *Attorney, Agent, or Firm* — Patent Capital Group

(57) ABSTRACT

A method and apparatus for estimating and compensating TX LO leakage using circuitry on a loopback path connecting the transmitter and receiver are provided. The TX LO leakage may be estimated by measuring the DC signal on the receiver, measuring the phase difference between the received LO signal and the receiver LO signal, and filtering LO harmonics that may arise from the use of non-linear mixers. The DC signal on the receiver may be measured by opening and closing the loopback path, or changing the gain of the loopback path, or flipping the phase of looped back TX signal. The method may be used in an initialization or tracking calibration scheme.

30 Claims, 7 Drawing Sheets

(56) References Cited

U.S. PATENT DOCUMENTS

| | | |
|---|---|---|
| 8,755,756 B1* | 6/2014 | Zhang et al. ............. 455/114.2 |
| 2005/0175132 A1* | 8/2005 | Yang ............................. 375/350 |
| 2007/0072571 A1* | 3/2007 | Sun et al. .................... 455/280 |
| 2007/0123182 A1 | 5/2007 | Dekker |
| 2007/0194886 A1 | 8/2007 | Bang et al. |
| 2007/0202812 A1 | 8/2007 | Park et al. |
| 2008/0039045 A1 | 2/2008 | Filipovic et al. |
| 2012/0076188 A1* | 3/2012 | Cohen .......................... 375/224 |
| 2013/0141153 A1* | 6/2013 | Chang et al. ................ 327/365 |

OTHER PUBLICATIONS

Jarwala et al, End-to-End Test Strategy, 1995 http://ieeexplore.ieee.org/xpls/abs_all.jsp?arnumber=529940&tag=1.*
Maxim, Class D Audio Amplifier, 2002 http://www.maximintegrated.com/en/app-notes/index.mvp/id/624.*
Partial European Search Report in counterpart European application No. 14157512.6, communication dated Jul. 4, 2014, 7 pages.

* cited by examiner

<u>100</u>

<u>150</u>

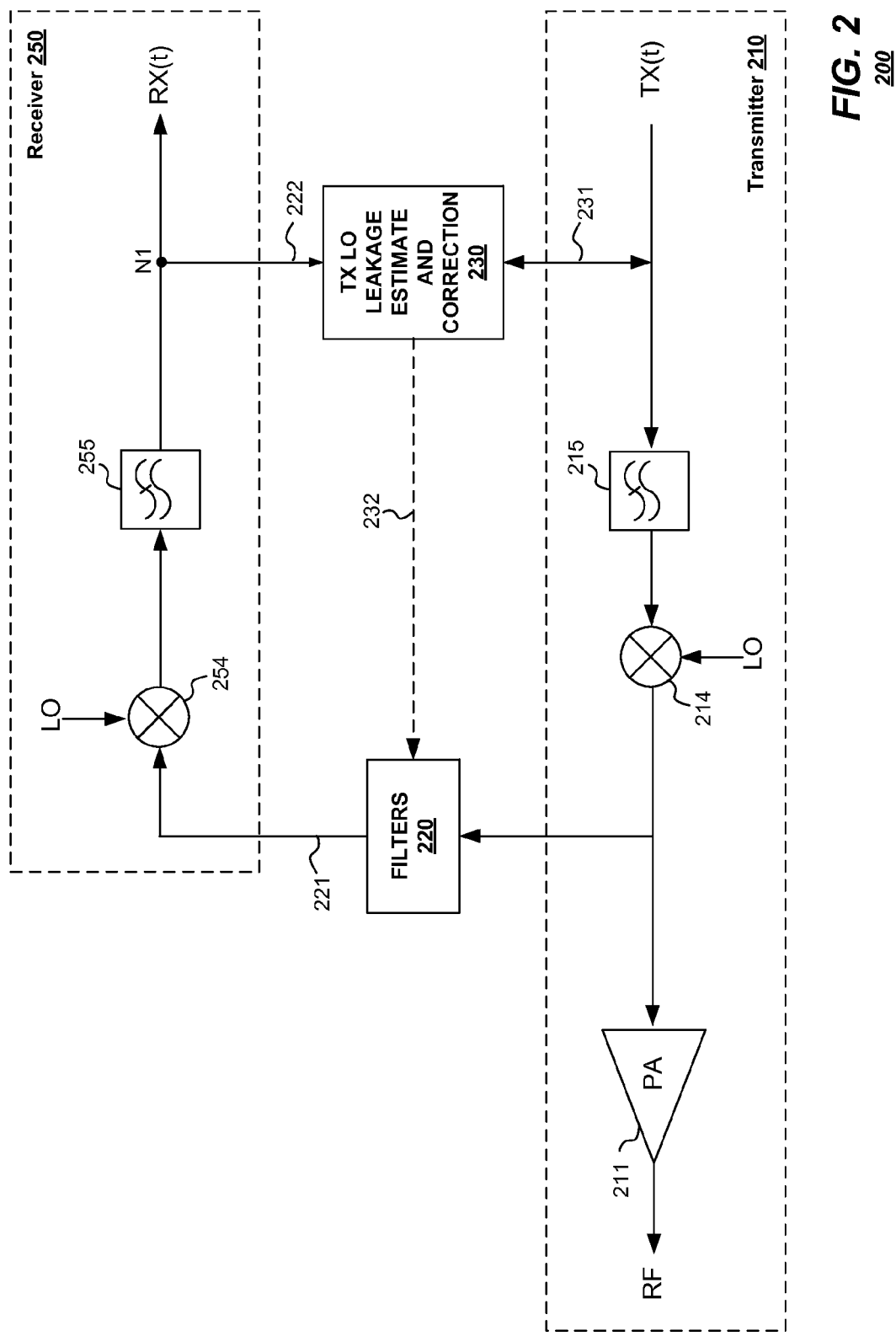

300

400

500

600

700 ns, where the quadrature component is 90 degrees out-of-phase from the in-phase component. A receiver, such as the one shown in FIG. 1B, tuned to the same carrier frequency as the transmitter extracts the baseband signal from the modulated carrier through demodulation, which is the reverse process of modulation. A wireless device may have discrete transmitters and receivers, or it may have a transceiver, which integrates a transmitter and receiver into a single package.

TRANSMITTER LO LEAKAGE CALIBRATION SCHEME USING LOOPBACK CIRCUITRY

BACKGROUND

The present invention relates to transceivers. More specifically it relates to estimation of TX LO (transmitter local oscillator) leakage in a calibration for a transmitter utilizing direct conversion.

Wireless communication systems such as cellular phone networks, BLUETOOTH, GPS, and wireless local area networks (LAN) enable the transfer of data between devices in the system through the use of radio waves. Data transmitted from a source to a destination in a wireless system must typically be encoded into a manner suitable for transmission at a desired frequency. A transmitter, such as the one shown in FIG. 1A, formats an input signal (also referred to as a baseband signal) by modulating a carrier in the desired frequency band. The modulation may be implemented through amplitude, frequency, or phase variation of the carrier. An amplitude- and phase-modulated signal may be represented by means of in-phase and quadrature components, where the quadrature component is 90 degrees out-of-phase from the in-phase component. A receiver, such as the one shown in FIG. 1B, tuned to the same carrier frequency as the transmitter extracts the baseband signal from the modulated carrier through demodulation, which is the reverse process of modulation. A wireless device may have discrete transmitters and receivers, or it may have a transceiver, which integrates a transmitter and receiver into a single package.

Modulation poses significant implementation challenges. In a direct conversion transmitter, a local oscillator (LO) is used to upconvert a modulated analog baseband signal to a desired radio frequency. For example, in FIG. 1A, the TX (transmit) signal comprised of in-phase I(t) and quadrature Q(t) components is first filtered by baseband filters 110. Local oscillators 121, 122 generate a signal at a carrier frequency for converting I(t) and Q(t) to the carrier frequency using mixers 120 (also referred to as an upconverter). I(t) and Q(t) are then combined by summer 130, amplified by power amplifier 140, and transmitted as an RF signal.

LO leakage will typically occur when mixer 120 upconverts the baseband signal to a carrier frequency. LO leakage arises from DC offset in the TX baseband circuits as well as direct coupling of TX LO 121, 122 to the TX output. It degrades the transmission signal quality and creates in-band spurious emissions. Therefore, LO leakage should be measured and removed to improve signal quality and to conform to standards established by the FCC and other administrative bodies.

A TX LO leakage signal manifests as a DC signal in the receiver using the same LO frequency. Thus, TX LO leakage may be detected by measuring the DC offset in the receiver and cancelled by applying a DC offset corresponding to the level of LO leakage in the TX baseband. However, the measured DC offset in the receiver may be corrupted, thereby not accurately reflecting the TX LO leakage. Measurement is further complicated by a continuously running TX, wherein calibration must occur without taking the TX offline. Some factors that corrupt the RX (receiver) DC offset measurement are: LO leakage of the measurement circuitry itself, DC offsets in the baseband of the RX, phase differences between the received signal and the receiver's own LO signal, and LO harmonics arising from the use of non-linear mixers, such as switching mixers.

TX LO leakage measurement may be corrupted by the LO leakage of the measurement circuitry itself when the downconverter in the receiver uses the same LO signal as the TX. LO leakage of any components in the measurement circuitry will be downconverted to DC. Thus, the measured DC will not be purely due to TX LO leakage, but will also include any DC offsets from the measurement circuitry.

TX LO leakage measurement may be corrupted by phase difference between the received LO signal and the receiver-generated LO signal, when a signal is broken down and transmitted in its constituent in-phase and quadrature components. This is because the phase difference gives rise to coupling between the in-phase and quadrature components of the LO leakage signal. Additionally, phase may vary due to temperature and over time, and TX signaling frequency may vary as well.

TX LO leakage measurement may be corrupted if the mixers used for TX and RX are non-linear mixers, such as switching mixers. When a switching mixer is used for upconversion, the TX output will have a signal at the LO fundamental frequency corresponding to the TX LO leakage signal to be measured and removed, as well as additional signals at odd harmonics of the LO frequency. These LO harmonics at the TX output are downconverted by the switching mixer at the receiver due to conversion gains at all odd harmonics of the LO leakage signal, thereby corrupting the measurement of the TX LO leakage.

Therefore, there is a need in the art for accurately measuring the DC signal in the receiver corresponding to TX LO leakage, reducing or removing the error sources in the loopback circuitry, estimating the phase difference between the received carrier signal and the receiver LO signal, and reducing or removing LO harmonics when using a switching mixer.

BRIEF DESCRIPTION OF THE DRAWINGS

FIG. 2 is a block diagram of a system according to an embodiment of the present invention.

SUMMARY

Figure 1A:
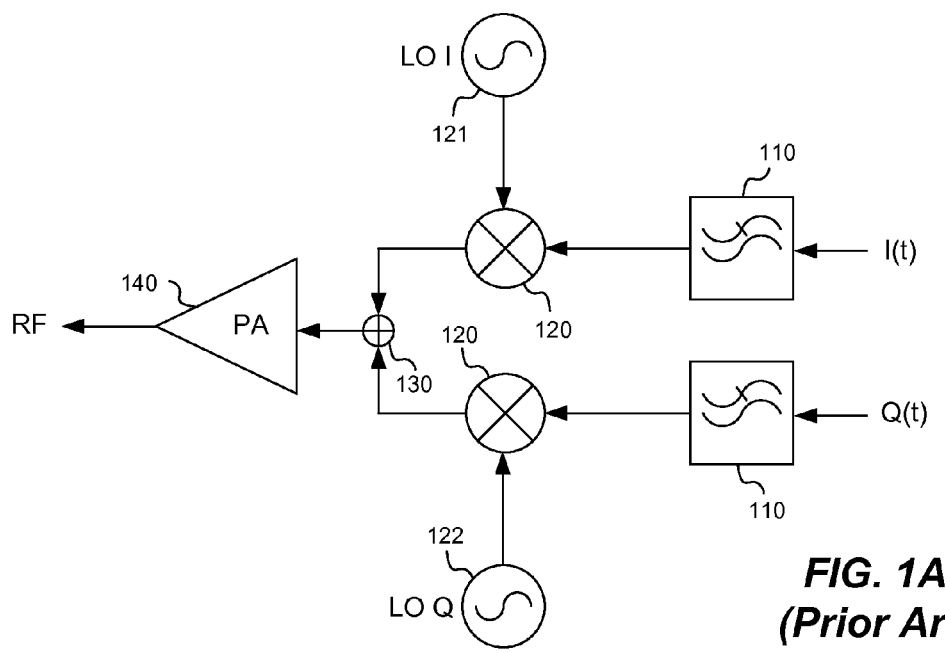
FIG. 1A shows a conventional direct conversion transmitter architecture.

Embodiments of the present invention provide a method and system for estimating and correcting TX LO leakage in a calibration scheme using circuitry on a loopback path connecting the transmitter and receiver (also referred to as "loopback circuitry"). Such methods may include measuring the RX DC signal using the loopback path. In one method, the loopback path may be opened/closed and the DC signal observed. In another method, the DC signal may be measured by changing the gain of the loopback path. In the third method, the DC signal may be measured by flipping TX phase. Such methods may also include filtering out LO harmonics. Such methods may be employed in a calibration scheme run at start-up, at any time during the operation of the circuit, or continuously to detect, track, and cancel TX LO leakage. The methods may be implemented through the use of filters, buffers and/or switches in the loopback path, which may open and short the loopback path.

DETAILED DESCRIPTION

The present invention provides for a loopback path having filters and/or buffers, and a TX LO leakage estimation and correction algorithm to sample the looped back TX signal (the "looped back TX signal" is also referred to as the "RX signal") to detect and cancel the TX LO leakage. The present invention estimates TX LO leakage by detecting and correcting phase differences and removing harmonics of an LO signal.

FIG. 2 is a functional block diagram of an RF transceiver system 200 for estimating and correcting TX LO leakage according to an embodiment of the present invention. The system 200 may include a transmitter 210, a receiver 250, a TX LO leakage estimation and correction unit 230, and a coupling unit 220, which may be provided in a common integrated circuit. The transmitter 210 may modulate a baseband signal TX(t) to convert it to an RF signal at a desired frequency. The receiver 250 may demodulate an RF signal to extract the baseband signal RX(t). TX(t) is ideally equal to RX(t), but RX(t) may be corrupted by TX LO leakage and other errors. The present invention estimates and substantially cancels TX LO leakage.

The transmitter 210 and the receiver 250 may be connected by a first segment 221 of a loopback path that may be opened or closed by the coupling unit 220. The coupling unit 220 may aid the estimation measurements for the TX LO leakage by isolating the receiver 250 from the transmitter 210. The TX LO leakage estimation and correction unit 230 may estimate the TX LO leakage by measuring the DC signal in the receiver via a second segment 222 of the loopback path and the coupling unit 220 (also shown as "filters"), and cancel the TX LO leakage by modifying TX(t), as represented by double arrow 231. The coupling unit 220 and the TX LO leakage estimation and correction unit 230 may each be implemented discretely or as part of the transmitter 210 or the receiver 250. The coupling unit 220 and the TX LO leakage estimation and correction unit 230 may communicate with each other via path 232.

Figure 1B:
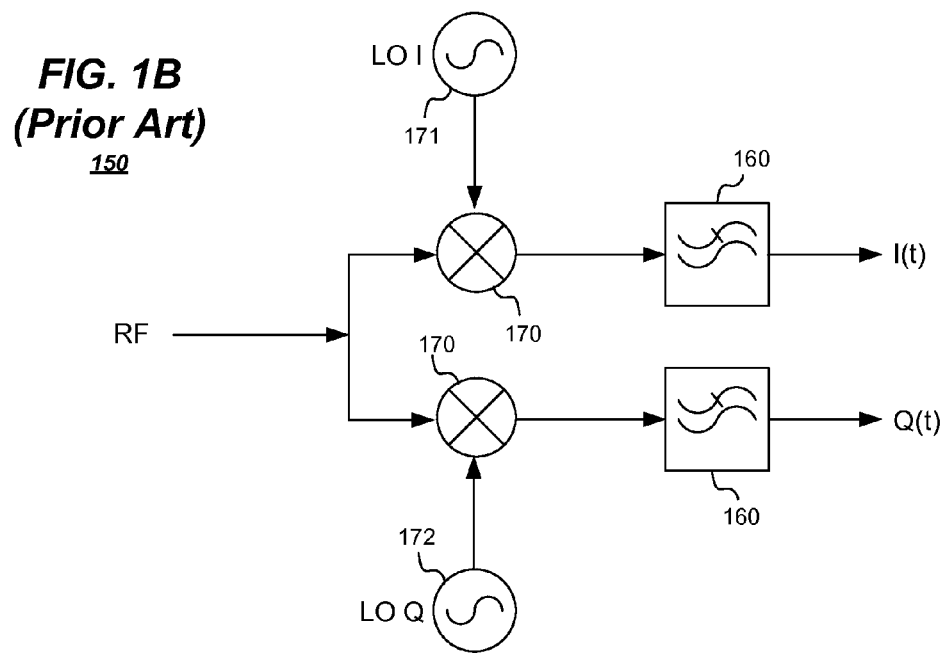
FIG. 1B shows a conventional direct conversion receiver architecture.

In an embodiment, the transmitter 210 may include baseband filter 215, upconverter 214, and amplifier 211. The receiver 250 may include baseband filter 255 and downconverter 254. The baseband signal TX(t) may be filtered by baseband filter 215. The mixer 214 may upconvert the conditioned baseband signal to the desired frequency using LO, as shown. During operation, the coupling unit 220 may estimate TX LO leakage by opening and shorting the loopback path, or changing the gain of the loopback path, or flipping the polarity of the loopback TX signal Substantially all LO harmonics except the fundamental may also be attenuated. In an embodiment, the coupling unit 220 functions as a TX inversion switch and filter. A TX LO estimation and correction unit 230 may also estimate TX LO leakage by sampling the RX signal, for example at node N1, detecting phase difference between the TX LO and RX LO, calculating a compensation signal to cancel TX LO leakage, and injecting the compensation signal via path 231. Baseband filter 255 may further filter the de-modulated signal to remove noise. Once TX LO leakage is accurately measured, the TX LO leakage can then be substantially removed. Although not shown, the signals may have in-phase (also referred to as "I") and quadrature (also referred to as "Q") components, as shown in FIG. 1.

Figure 3:
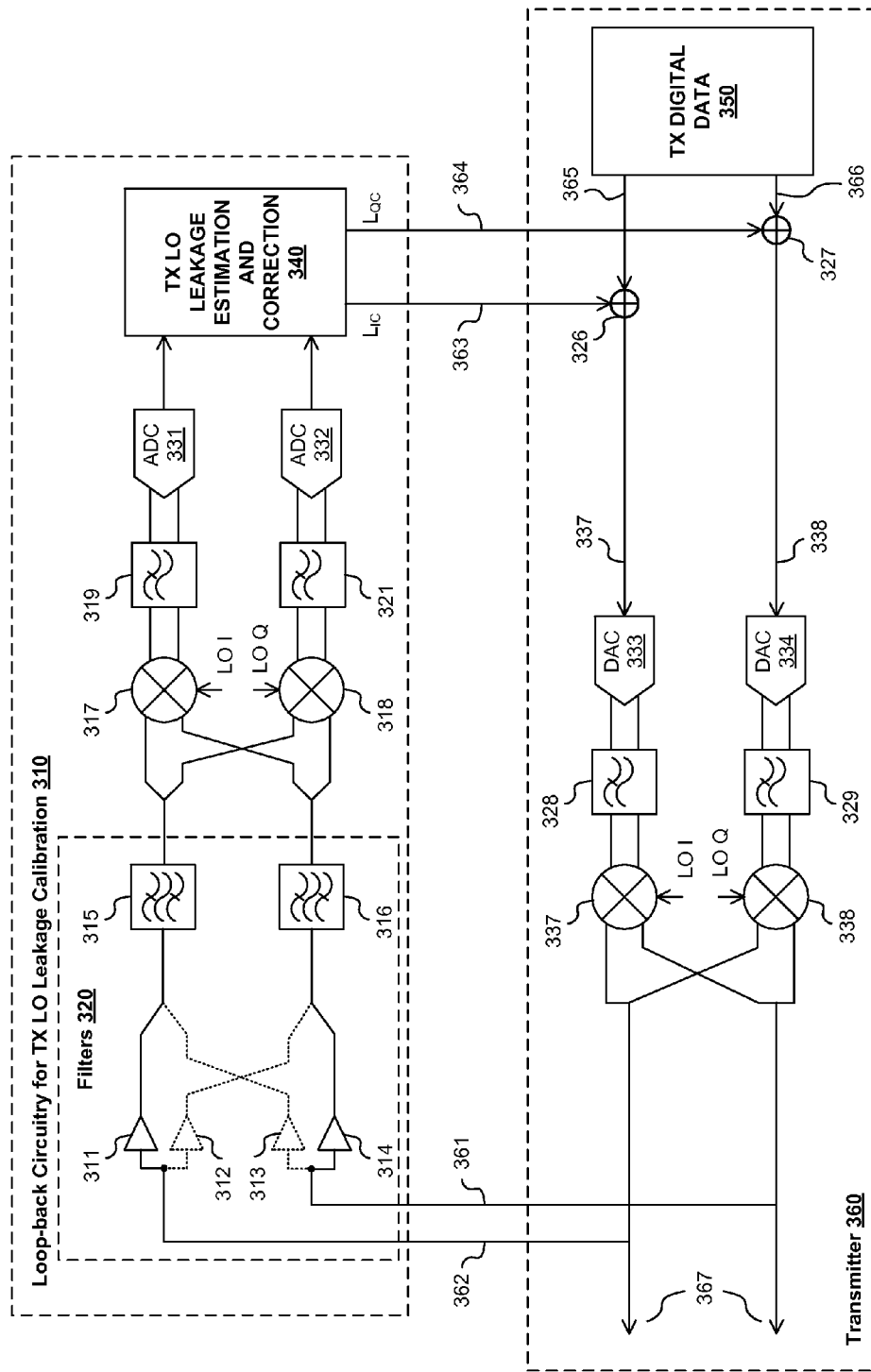
FIG. 3 is a simplified circuit diagram of a transceiver having filters for TX LO leakage estimation and correction according to an embodiment of the present invention.

FIG. 3 is a simplified circuit diagram of a transceiver 300 that estimates and corrects TX LO leakage according to an embodiment of the present invention. The transceiver 300 may include a transmitter 360 and loopback circuitry 310. The transmitter 360 may modulate a baseband signal shown as TX digital data 350, to convert it to an RF signal at a desired frequency. The loopback circuitry 310 enables the estimation of TX LO leakage by opening and shorting the loopback path via segments 361, 362; or changing the gain of the loopback path; or flipping the polarity of the loopback TX signal, or filtering out any LO harmonics. The loopback circuitry 310 may be implemented off-chip, or may reuse circuitry of an on-chip receiver.

The transmitter 360 may include summers 326, 327; digital-to-analog converters (DACs) 333, 334; baseband filters 328, 329; and upconverters 337, 338. Summers 326, 327 may combine a compensation signal computed by a TX LO leakage estimation and correction unit 340 with a baseband signal transmitted via paths 365, 366 to cancel TX LO leakage. The DACs 333, 334 may convert a digital baseband signal to an analog signal. These units have the same functions and characteristics as those described above for FIG. 2, unless described elsewhere herein.

The exemplary loopback circuitry 310 may include a TX LO leakage estimation and correction unit 340; analog-to-digital converters (ADCs) 331, 332; baseband filters 319, 321; downconverters 317, 318; coupling unit 320, which may include LO harmonic filters 315, 316 and buffers 311-314. These units have the same functions and characteristics as those described above for FIG. 2, unless described elsewhere herein.

In a method for detecting TX LO leakage according to an embodiment of the present invention, the loopback path (for example, segments 361, 362) is opened and closed, for example, by filters, buffers, and/or switches. In an embodiment shown in FIG. 3, the buffers 312 and 313 (shown in phantom) are not used. For example, they may be off or simply not included in the circuitry. Due to the formation of the loopback path for measurement, there may be disturbance to TX. The buffers 311 and 314 may be constantly enabled to reduce or substantially prevent any disturbance to TX via path 367.

Two modes of operation may be performed sequentially to detect the level of TX LO leakage in the transceiver 300. In a first mode of operation, the LO harmonic filters 315 and 316 are disabled such that the DC offset (DCa) of the loopback circuitry 310, including LO leakage of the downconverters 317 and 318, is measured. In a second mode of operation, the LO harmonic filters 315 and 316 are enabled such that the TX signal is looped back to the loopback circuitry 310 via path segments 361 and 362 and a new DC offset (DCb) is measured.

In theory, the difference between DCa and DCb, DCb−DCa, should be the DC offset caused by the TX LO leakage. However, calibration error may result from impedance mismatch when transitioning between the two modes of operation, so DCb−DCa will also account for any DC offset caused by loopback LO leakage (also referred to as "RX LO leakage") variation. The last stage of the LO harmonic filters 315 and 316 may be constantly enabled to maintain a substantially constant impedance seen by the downconverters 317 and 318.

The function of disabling and enabling the LO harmonic filters may be implemented in other ways. For example, the gain of the LO harmonic filters may be changed between the first and second modes of operation, rather than completely disabling and enabling the LO harmonic filters 315 and 316.

In the third method for detecting TX LO leakage according to an embodiment of the present invention, the polarity of the loopback transmit signal is flipped and measured. All four buffers 311-314 are used. Two modes of operation may be performed sequentially to detect the level of TX LO leakage in the transceiver 300. In a first mode of operation, buffers 311 and 314 are enabled and buffers 312 and 313 are disabled, and a DC offset (DC1) is measured. DC1 includes any DC offset caused by TX LO leakage, as well as any DC offset caused by the loopback circuitry 310. In a second mode of operation, buffers 312 and 313 are enabled and buffers 311 and 314 are disabled, and another DC offset (DC2) is measured. DC2 includes any DC offset caused by TX LO leakage of opposite polarity compared with DC1, as well as any DC offset caused by the loopback circuitry 210.

The difference between DC1 and DC2, DC2−DC1, is approximately twice the level of the DC offset caused by TX LO leakage. In other words, the difference between DC1 and DC2 is caused by TX LO leakage alone, and an accurate measurement of TX LO leakage may be made. Additionally, this measurement effectively doubles the loopback path gain for the loopback TX signal, whereas the loopback TX noise is only 3 dB higher. Therefore, the signal-to-noise ratio of the loopback TX is 3 dB higher. To minimize TX LO leakage, the difference between DC1 and DC2 may be minimized. Disturbance to TX may be minimized by slowing the transition between the two modes of operation relative to the TX signal when the four buffers 311-314 are placed at the front of loopback circuitry 310. However, the four buffers may also be placed inside filters 315, 316, or after filters 315, 316 (see FIG. 9), to minimize disturbance to TX without slowing the transition between the two modes of operation. Any number of buffers may be used, so long as the polarity of the loopback TX signal is flipped. Alternatively, all of the aforementioned buffers may be replaced with switches or other circuits, as long as the polarity of the loopback TX signal is flipped. When switches are used, the functional equivalent of an enabled buffer is a closed switch, and the functional equivalent of a disabled buffer is an open switch. Like the buffers, the switches may be placed before the filters, inside the filters or after the filters.

The LO harmonic filters 315, 316 may filter out harmonics of an LO signal. When a non-linear mixer such as switching mixer is used to modulate and demodulate a signal, LO harmonics may arise. In other words, the TX output at LO harmonics is represented by the following equation:

$$TX\ \text{out}_{lo}(t) = (A_1 + B_1)\cos(\omega_{lo}t) + (k_3 A_1 + B_3)\cos(3\omega_{lo}t) + (k_5 A_1 + B_5)\cos(5\omega_{lo}t) + \ldots$$

where $(A_1 + B_1)\cos(\omega_{lo}t)$ is the fundamental TX LO leakage to be detected and removed, $\omega_{lo}$ is the angular frequency of the LO, t is time, $A_1$ is the amplitude of the fundamental TX LO leakage due to DC offset in the TX baseband, and $B_1$ is the amplitude of the fundamental TX LO leakage due to direct coupling of the LO to the TX output. The remaining terms represent higher order LO leakage frequency terms, where $k_3 A_1$ and $k_5 A_1$ result when a non-linear mixer is used for upconversion, and $B_3$ and $B_5$ are direct coupling terms when TX LO does not use a sine wave.

The loopback receiver DC term is ideally equal to the detected TX LO leakage as represented by the following equation:

$$RX\ \text{out}_{DC\ only} = \alpha_1(A_1 + B_1)$$

where $\alpha_1$ is the gain from the TX output to loopback receiver output at the fundamental TX LO. However, the actual DC term seen at the loopback receiver is more closely approximated by the following equation:

$$RX\ \text{out}_{DC\ only} = \alpha_1(A_1 + B_1) + \alpha_3(k_3 A_1 + B_3) + \alpha_5(k_5 A_1 + B_5) + \ldots$$

where $\alpha_3$ is the gain at the third harmonic, and $\alpha_5$ is the gain at the fifth harmonic. The harmonic terms $\alpha_3(k_3 A_1 + B_3)$ and $\alpha_5(k_5 A_1 + B_5)$ reduce the accuracy of the TX LO leakage estimation, and should be removed. The LO harmonic filters 315, 316 may substantially attenuate the higher order terms $\alpha_3(k_3 A_1 + B_3)$ and $\alpha_5(k_5 A_1 + B_5)$, giving a signal closer to $\alpha_1(A_1 + B_1)$, corresponding to the TX LO leakage for subsequent measurement by the loopback circuitry 310.

Figure 4:
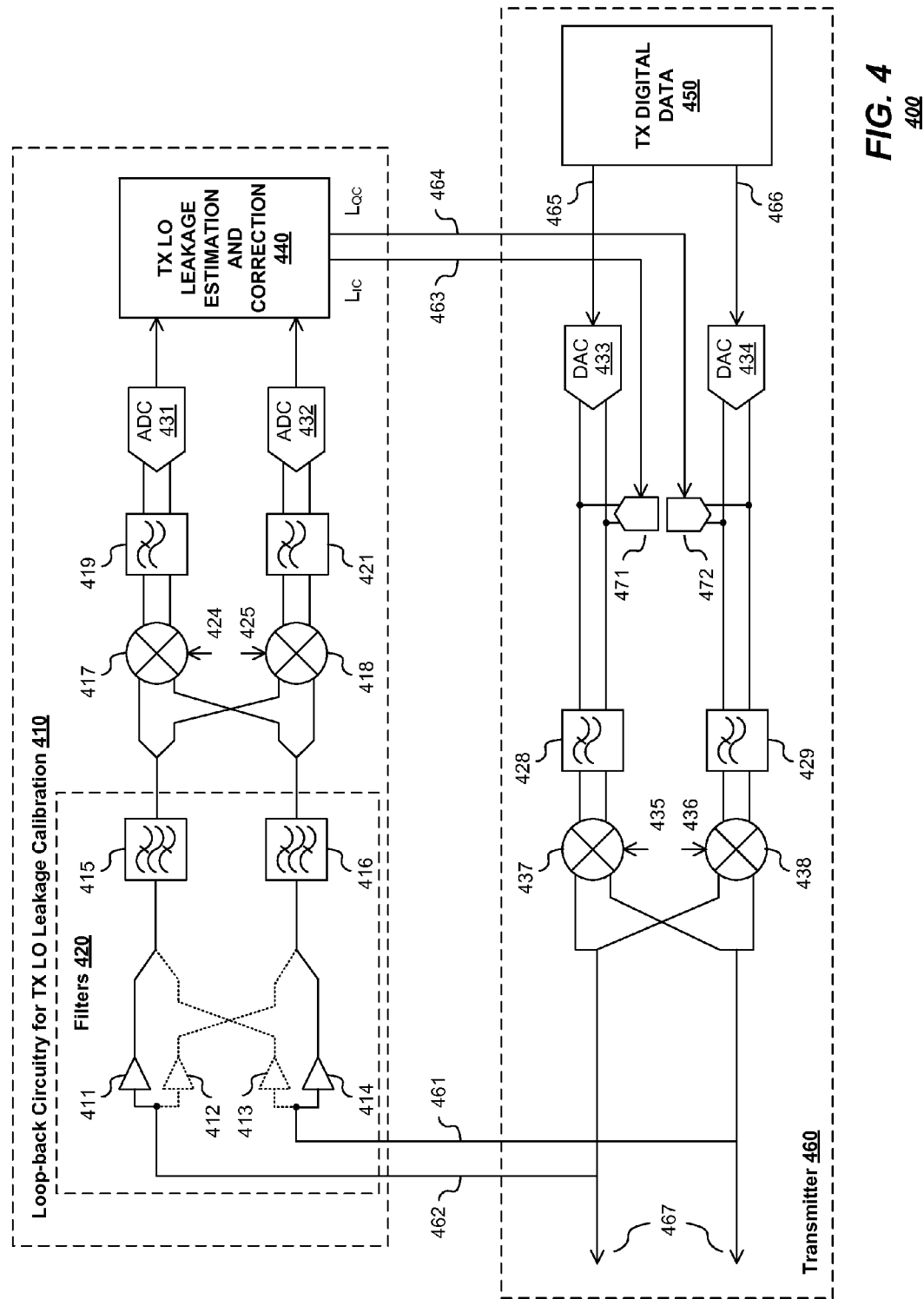
FIG. 4 is a simplified circuit diagram of a transceiver with TX LO leakage estimation and calibration applying DC offsets with DACs according to an embodiment of the present invention.

Phase difference between the looped-back signal and the receiver's LO also corrupts TX LO estimation and may be accounted for in the estimation of TX LO leakage as described herein. The TX LO leakage may be cancelled by injecting a compensation signal corresponding to the level of estimated TX LO leakage via paths 363, 364. For example, a digital compensation signal having in-phase and quadrature components $L_{IC}$ and $L_{QC}$ may be calculated by TX LO estimation and correction unit 340, and injected into the TX baseband via summers 326, 327. FIG. 4 shows another method for injecting the compensation signal into the TX baseband.

FIG. 4 is a simplified circuit diagram of a transceiver 400 with TX LO leakage estimation and calibration applying DC offsets with DACs according to an embodiment of the present invention. The transceiver 400 may have the same components with the same functions and characteristics as those described above for FIGS. 2 and 3, unless described elsewhere herein. In addition, the transceiver 400 may have DC offset DACs 471, 472 for applying DC offsets at TX baseband. As contrasted with the transceiver 300 of FIG. 3, the transceiver 400 compensates TX LO leakage by modifying the TX baseband signal after the signal has been converted to analog form by DACs 433, 434. DC offset DACs 471, 472 convert the digital compensation signals $L_{IC}$, $L_{QC}$, which may be computed by TX LO leakage estimation and correction unit 440, to analog form and combines the compensation signal with the analog form of the TX signal prior to modulation by upconverters 437, 438.

In alternative embodiments of the present invention, it is also possible to reject or avoid harmonics by placing LO harmonic filters anywhere prior to down conversion (such as prior to the buffers 411-414), using a harmonic rejection mixer in the loopback circuitry, or using a linear mixer such as a linear multiplier with a sine wave LO in the loopback receiver. Buffers may be embedded into the LO harmonic filters. Buffers may also be implemented with any isolating circuitry, such as CMOS source followers. The filters described above may be implemented with amplifiers. Although not shown as such, the LO harmonic filters may have multiple stages. It is also possible to effectively flip the polarity of the TX signal by switching the polarity of the LO signals of the loopback mixers. In such a method, the buffers 412 and 413 (shown in phantom) are not used.

Figure 5:
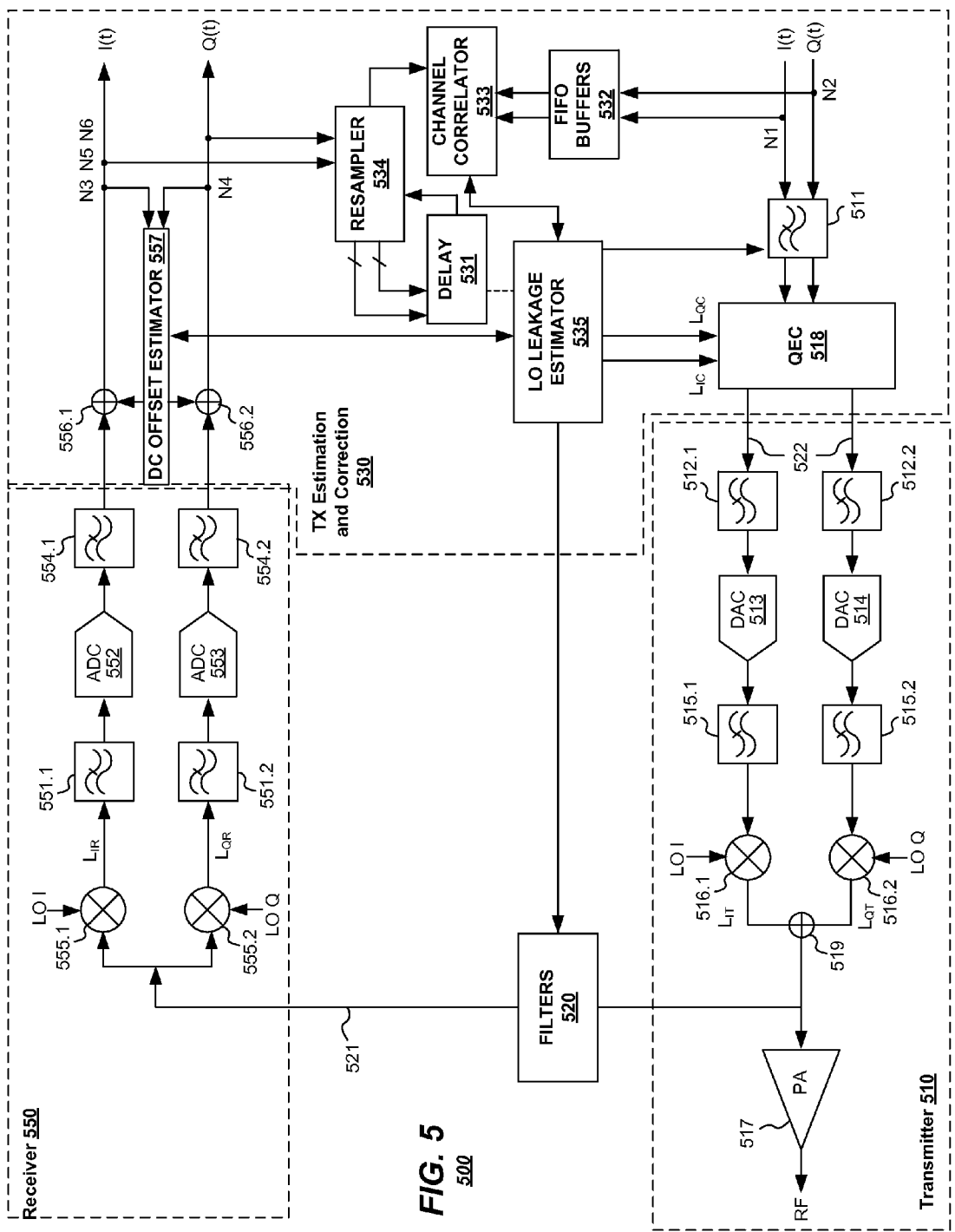
FIG. 5 is a block diagram of a system having a TX LO leakage estimation and correction algorithm according to an embodiment of the present invention.

FIG. 5 is a block diagram of an RF transceiver system 500 for estimating and correcting TX LO leakage according to an embodiment of the present invention. The system 500 may include a transmitter 510, a receiver 550, a TX LO leakage estimation and correction unit 530, and coupling unit 520, which may be provided in a common integrated circuit. These units have the same functions and characteristics as those described for FIGS. 2 to 4, unless described elsewhere herein. In this embodiment of the present invention, the TX and RX signals are shown in their constituent I and Q components.

The exemplary transmitter 510 may include digital filters 512.1, 512.2 and DACs 513, 514; upconverters 516.1, 516.2; a summer 519; and an amplifier 517. If the TX sampling rate is not matched to the DAC's (represented at 513, 514) sampling rate, the transmitter 510 may further include low pass filters 515.1, 515.2. The digital filters 512.1, 512.2 may enhance or reduce aspects of a signal for subsequent processing. The upconverters 516.1, 516.2 may convert signals to a designated carrier frequency with the aid of local oscillators having leakage components $L_{IT}$ and $L_{QT}$. The low pass filters 515.1, 515.2 may be image rejection filters that attenuate images of transmit signals at multiples of the sampling frequency. The low-pass filters 515.1, 515.2 may match the data rate to the DAC sampling rate, and may allow the DACs 513, 514 to operate at a higher sampling rate to ease the image rejection requirements. In an embodiment, the TX signal is sampled at the output of the power amplifier 517. In another embodiment, the TX signal is sampled at the output of the summer 519.

In operation, a digital signal having components I(t) and Q(t) may be filtered by the digital filters 512.1, 512.2 before being converted to an analog signal by the DACs 513, 514. The low pass filters 515.2, 515.2 may further condition the analog signal before modulation by the upconverters 515.1, 516.2. The summer 519 may then combine the I(t) and Q(t) components and output a single signal. The signal may then be amplified by the power amplifier 517 and transmitted as an RF signal. To cancel TX LO leakage, the TX signal may be processed by a TX IQ and LO leakage compensation network (QEC) 518 prior to filtering and modulation as shown.

The exemplary receiver 550 may include downconverters 555.1, 555.2; anti-aliasing filters 551.1, 551.2; ADCs 552, 553; and digital filters 554.1, 554.2. These units have the same functions and characteristics as those described above for FIGS. 2 to 4, unless described elsewhere herein. The downconverters 555.1, 555.2 may convert signals from a carrier frequency with the aid of local oscillators LO I and LO Q. The anti-aliasing filters 551.1, 551.2 may ensure an adequate sampling rate by subsequent ADCs to prevent aliasing.

In operation, an RF signal may be demodulated by the downconverters 555.1, 555.2 to extract the original baseband signal having components I and Q. The analog signal may be filtered by the anti-aliasing filters 551.1, 551.2 before conversion to a digital signal by the ADCs 552, 553. The digital signal may be further processed by the digital filters 554.1, 554.2. The received signal (also referred to as "observed signal") may have leakage components $L_{IR}$ and $L_{QR}$.

A segment 521 of a loopback path may be formed by connecting the output of the transmitter via the filters 520, for example prior to amplification by amplifier 517 to the input of the receiver 550. A TX LO leakage correction signal may be injected into the transmit path via segment 522 after TX LO leakage has been measured. Additional circuitry described below may sample the signals using the loopback path to detect and compensate TX LO leakage.

The resampler 534 may sample the output of the receiver 550 at nodes N5 and N6 at a resampling phase determined by the delay computer 531. The DC offset estimator 537 controlled by a LO leakage estimation process (such as the process 600 of FIG. 6) estimates the DC signal on the received signals. The LO leakage estimation process assures the estimation duration is sufficient to get a good estimate of the DC signals. The estimator 537 may be in the path (as shown), or sample the receive signal at nodes N3 and N4, without using summers 556.1 and 556.2 to apply any correction. During the LO leakage estimation process, the resampler 534 may output the sampled RX signal to the channel correlator 533. The channel correlator 533, correlates the samples provided by the FIFO buffer 532, sampled from the transmit path at nodes N1 and N2, against itself and by the samples provided by the resampler 534. That is, the channel correlator 533 is used to determine the following quantities:

$$E\begin{bmatrix} s_i(n)s_i(n) & s_i(n)s_q(n) \\ s_i(n)s_q(n) & s_q(n)s_q(n) \end{bmatrix} \text{ and } E\begin{bmatrix} s_i(n)r(n) \\ s_q(n)r(n) \end{bmatrix}$$

The values are used to estimate the transmit-to-receive channel, h, based on well-known techniques. The channel, h, may be used either to ascertain the phase difference between a received carrier phase and a receiver-generated LO at time "n", β(n), (also referred to as "phase difference between TX and RX"), and/or track the phase difference variations over time. If the channel, h, is used to track the phase variation over time, then an accurate estimate of the phase difference between the TX and RX, β, may be ascertained initially, by injecting a strong in-phase dc signal into the in-phase component of the transmitter, and measuring the resultant received in-phase and quadrature dc signals. Upon estimating β, an iterative procedure (such as the one provided in method 700 below) may be used to update leakage compensation values $L_{IC}$ and $L_{QC}$ in accordance to the de-rotator equation given below. This procedure may be repeated, utilizing the values of $L_{IC}$ and $L_{QC}$ in the previous iteration, to refine the initial estimate of β. Other initialization techniques are also possible to measure β. For example, a complex DC signal may be injected and the received complex DC signal de-rotated such that the transmitted and received DC signals have the same phase.

Letting $\widehat{h_i}$ (g) and $\widehat{h_i}$ (l) represent the channel estimations, at two different instances of time, the relative channel variation, $h_{rel}$, is given by $$h_{rel} = \frac{\widehat{h_i}(l)}{\widehat{h_i}(g)}$$

And the de-rotator component at time, n, is modified in accordance to:

$$\exp(-j\beta(n)) = \exp(-j\phi(h_{rel}))\exp(-j\beta(n-1))$$

Transmit signaling may be used to ascertain the channel, h. Transmit signals may include a single or a combination of narrow- and wideband signals. The location of transmit signals relative to LO can be anywhere within the frequency span of the transmitter. Furthermore, transmit signaling can change over time. That is, additional channels may be added or removed, or the transmission frequency of a channel may change over time. Thus, the observed signal and the measured channel may contain a signaling dependent component. As a result, the measure channel may also include a signaling-dependent component that may change over time. The received signal may then be phase equalized relative to that of the transmit signal. As a result, when the channel is estimated, the transmit signaling and its characteristics does not impact the phase difference between the TX and RX.

The phase difference between the TX and RX, $\beta$, gives rise to coupling between the I and Q components of the TX LO signal. The coupling may be eliminated by estimating and compensating for the phase difference through a de-rotator represented by the equation below (where k is a constant):

$$\begin{bmatrix} L_{ic}(n) \\ L_{qc}(n) \end{bmatrix} = k \cdot \begin{bmatrix} \cos\beta & \sin\beta \\ -\sin\beta & \cos\beta \end{bmatrix} \begin{bmatrix} L_{ir}(n) \\ L_{qr}(n) \end{bmatrix} + \begin{bmatrix} L_{ic}(n-1) \\ L_{qc}(n-1) \end{bmatrix}$$

The QEC 518 network may substantially eliminate or minimize TX LO leakage by injecting a compensation signal with components $L_{IC}$ and $L_{QC}$ of equal magnitude and opposite polarity of the TX LO leakage components $L_{IT}$ and $L_{QT}$ into the transmitter 510. The value of $\beta$ may be accurately ascertained by initially estimating TX LO leakage $L_{IT}$ and $L_{QT}$. Secondly, a strong in-phase dc signal injected into the in-phase component of the transmitter, and measuring the resultant received in-phase and quadrature dc signals, which are then compensated by initial measured $L_{IT}$ and $L_{QT}$. Upon estimating $\beta$, an iterative procedure (such as the one provided in method 700 below) may be used to update leakage compensation values $L_{IC}$ and $L_{QC}$ in accordance to the de-rotator equation given above, by combining the current measured residual LO leakage with previous values, before applying a compensation signal to the transmit network.

The DC offset estimator 537 may sample the received signal or estimate the DC offset of the received digitized signal by averaging observed samples. In an embodiment, the DC offset estimator 537 may sample the received signal without applying any correction, that is, without using summers 556.1 and 556.2 to apply any correction, and instead only samples the receive signal at nodes N3 and N4. In another embodiment, the DC offset estimator 537 estimates the DC offset by using a running average of samples. For example, a sample N may be obtained and stored by the DC offset estimator 537. A subsequent sample, N+1 may be obtained at nodes N3 and N4, and averaged with the previous N−1 samples by summers 556.1, 556.2 to compute a running average of samples. In an embodiment, the DC offset estimator 537 may use this or other well-known methods to estimate the DC offset of the received signal and output this estimate to LO leakage estimator 535.

The LO leakage estimator 535 may estimate the level of LO leakage and apply correction factors $L_{IC}$ for the I component and $L_{QC}$ for the Q component of the TX signal via the QEC 518. The LO leakage estimator 535 may estimate TX LO leakage components $L_{IT}$ and $L_{QT}$ with the aid of the DC offset estimator 537, the delay computer 531, and the channel correlator 533 to compute the TX LO leakage. The LO leakage estimator 535 may control the filters 520 and the filters 511. The LO leakage estimator 535 may use an algorithm such as method 700 described herein.

The QEC 518 may modify a signal having I(t) and Q(t) components with a compensation signal having components $L_{IC}$ and $L_{QC}$. I(t) and Q(t) may be pre-processed by filters prior to processing in the QEC 518, and the output of the QEC 518 may be connected to any stage before filtering by digital filtering in a transmitter. $L_{IC}$ and $L_{QC}$ may be computed by a LO leakage estimator (such as the estimator 535 of FIG. 5).

Figure 6:
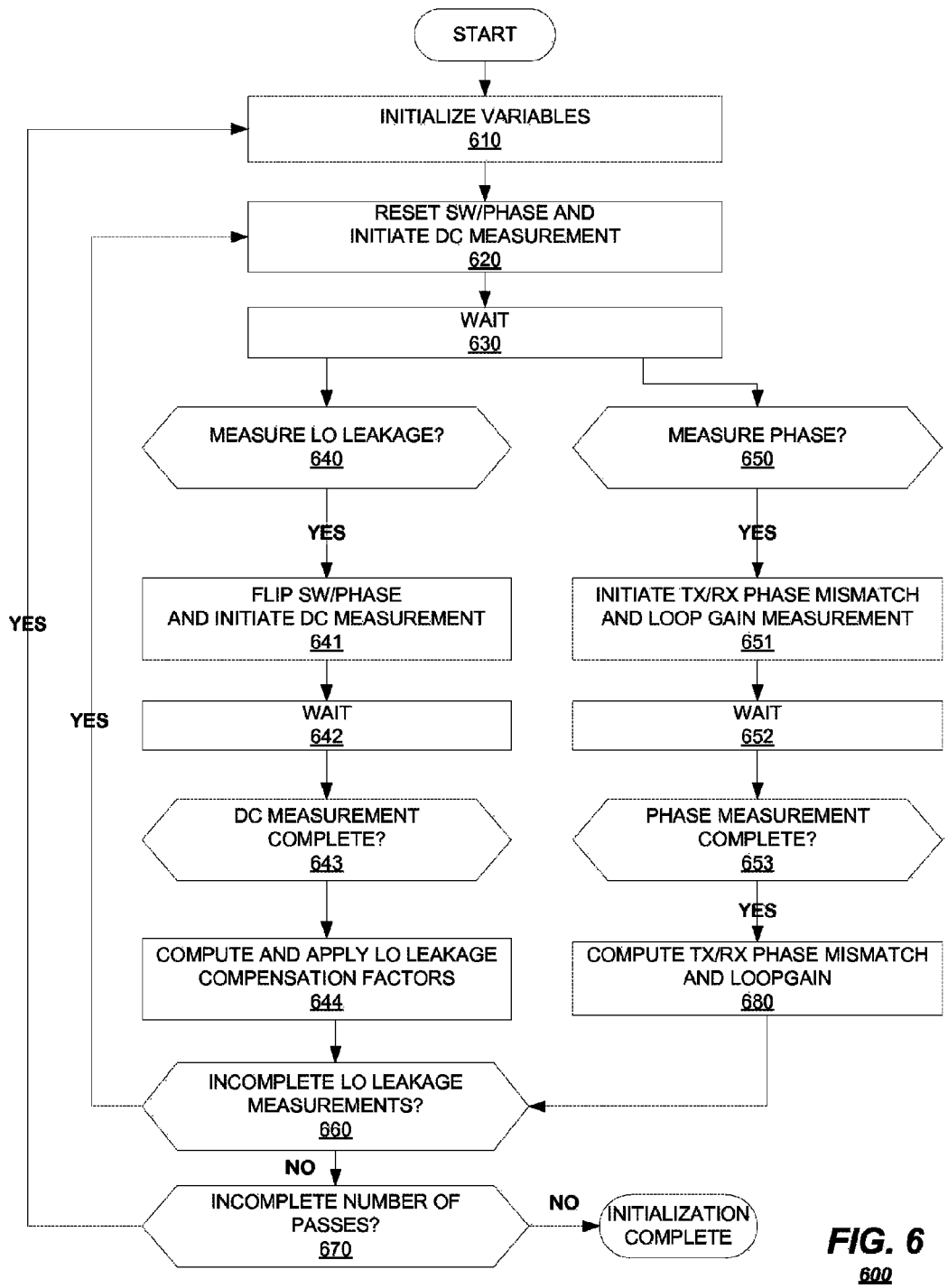
FIG. 6 is a flowchart illustrating a method for estimating and correcting TX LO leakage, and an initialization calibration procedure for a transceiver according to an embodiment of the present invention.

FIG. 6 illustrates an initialization calibration method 600 for estimating and compensating TX LO leakage. The method 600 may be a software algorithm stored in a control unit (such as the TX Estimation and Correction block 530 of FIG. 5) and may be executed by hardware and software components of a transceiver (such as the system 200 of FIG. 2). The method 600 estimates TX LO leakage by initially measuring the loop gain of the closed loop system and the phase difference between TX and RX. The values of the loop gain and phase difference are iteratively used to estimate $L_{IT}$ and $L_{OT}$, and compensate them.

The method 600 may initialize variables and counters such as the number of passes to perform, the number of LO leakage measurements to make, and phase measurement variables such as $\beta$ and loopback gain (box 610). The method 600 may access and modify a system memory (not shown), which may store, track, and update the variables and counters. In step 620, based on the variables, the method 700 resets switches (such as in the manner described above using switches or buffers) and initiates an RX DC offset measurement. In step 630 (and steps 642 and 652), the method 600 waits to allow processing time by the hardware specific blocks (such as the DC offset estimator 537 and LO leakage estimator 535 of FIG. 5) to settle to final values.

If it is determined that LO leakage measurement is desired in step 640, the method flips switches and/or phase (such as in the manner described above using switches or buffers), and initiates the RX DC offset measurement in step 641 and waits for corresponding hardware (such as the DC offset estimator 537 of FIG. 5) to settle to its final value in step 642. If it is determined that the RX DC offset measurement is complete in step 643, the method 600 may compute and apply LO leakage compensation factors $L_{IC}$ and $L_{QC}$ in step 644 (for example via the QEC 518 of FIG. 5). In step 660, the method 600 queries whether there are any incomplete LO leakage measurements based on the variables and counters. If there are incomplete LO leakage measurements, the method returns to step 620 to measure RX DC offset. The method 600 may be repeated until all LO leakage measurements are complete. If all LO leakage measurements are determined to be complete in step 660, the method proceeds to step 670. In step 670, the method queries whether there are any incomplete passes based on the variables and counters. If there are incomplete passes, the method returns to step 610. The method 600 may be repeated until all desired passes are complete. It is also possible to use method 600 to track calibration based on a user's desire to make multiple passes. If all passes are complete in step 670, initialization is complete and the process 600 ends.

The initialization method 600 may be performed in a single pass or multiple passes. In a first pass of method 600, the estimation of $\beta$ occurs without compensation values $L_{IC}$ and $L_{QC}$, and there may be some coupling of TX LO leakage DC in the loopback path measurements. TX LO leakage may be compensated such that when the loopback path is opened, the observed DC measurements on the receiver is decoupled from that of the TX LO leakage. In subsequent passes, the estimation of $\beta$ is made with compensation values $L_{IC}$ and $L_{QC}$. If the initialization method 600 is performed in a single pass, only the first pass may be performed. If the initialization method 600 is performed in multiple passes, the algorithm reiterates as described above, If it is determined that phase measurement is desired in step 650, the method initiates β and loop gain measurement in step 651 and waits for corresponding hardware to settle to its final value in step 652. In step 653, if it is determined that the phase measurement is complete, the method may compute β and loop gain based on the measurements in step 680. Loop gain measurement may be used to match the RX LO leakage to the TX LO leakage. At the end of the initialization calibration, a data path may be enabled, and a channel may be estimated. The channel estimate may be used as reference to ascertain channel changes over time during a tracking calibration method, such as the method 700 described herein. After step 680 is complete, the method 600 queries whether there are any remaining LO leakage measurements in step 660. The initialization calibration method 600 may be performed with the tracking calibration method 700.

Figure 7:
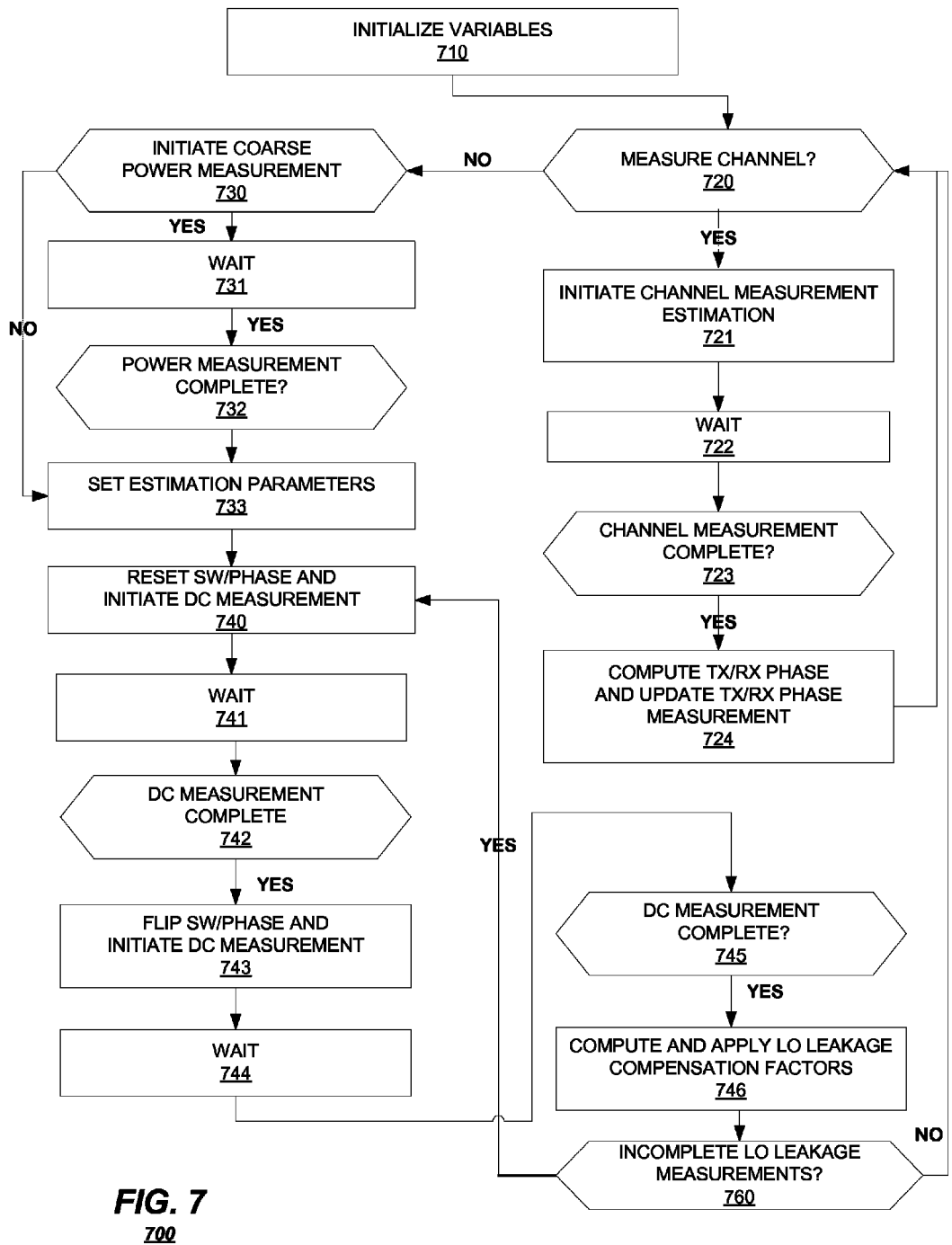
FIG. 7 is a flowchart illustrating a method for estimating and correcting TX LO leakage, and a tracking calibration procedure for a transceiver according to an embodiment of the present invention.

FIG. 7 illustrates a tracking method for estimating and correcting TX LO leakage, and a tracking calibration for a transceiver according to an embodiment of the present invention. The steps of the method 700 are the same as the corresponding steps described for FIG. 6, unless described elsewhere herein. For example, β may be measured from channel estimation.

The method 700 may initialize variables and counters such as the number of LO leakage measurements to make, and phase measurement variables such as β and loopback gain (box 710). The method 700 may access and modify a system memory (not shown), which may store, track, and update the variables and counters. If it is determined in step 720 that channel measurement is desired, the method 800 initiates a channel measurement estimation in step 721 and waits for corresponding hardware (such as the channel correlator 533 of FIG. 5) to settle to its final value in step 722. If it is determined that the channel measurement is complete in step 723, the method 700 may update β according to the equation given above for modifying the de-rotator component at time n. The tracking method 700 may be used throughout operation of the circuit to track changes in the channel conditions to measure and compensate the residual LO leakage in the system over time and in accordance to the de-rotator equation given above.

If it is determined in step 720 that channel measurement is not desired, the method 700 initiates coarse carrier power estimation in step 730. After initiating coarse power measurement in step 730, the method 700 waits for corresponding hardware to settle to its final value in step 731. In step 732, the method 700 queries whether coarse power measurement is complete. If it is not complete, it continues to wait. Otherwise, it continues to step 733, in which estimation parameters are set. In step 740, the method 700 resets the switches or phase and initiates an RX DC offset measurement. The method 700 waits for corresponding hardware to settle to its final value in step 731. Once DC measurement is complete in step 742, the method flips the switches or phase and initiates another RX DC offset measurement in step 743. The method 700 waits for corresponding hardware to settle to its final value in step 744.

In step 745, the method 700 queries whether the RX DC offset measurement is complete. If it is, the method 700 proceeds to step 746 in which it computes and applies LO leakage compensation factors. The method 700 then checks whether there are remaining LO leakage measurements to be completed in step 760. If there are incomplete LO leakage measurements, the method 700 proceeds to step 740 in which the switches or phase are reset and another RX DC offset measurement is taken. The method 700 then proceeds through the steps as described above. However, if all LO leakage measurements are complete, then the method 700 proceeds to step 720 in which it queries whether the channel is to be measured and proceeds through subsequent steps as described above.

Tracking calibration method 700 may be performed alone to estimate and cancel TX LO leakage, or may be performed following an initialization calibration method such as the method 600. The two methods may be implemented as two modes of operation in a control unit, or may be implemented separately on discrete circuitry.

The descriptions and illustrations of the embodiments above should be read as exemplary and not limiting. For example, although FIG. 3 is shown as a differential circuit, the circuit 300 may be implemented in a single-ended fashion with the filtering, connect/disconnect, and gain changing functionalities described herein. Modifications, variations, and improvements are possible in light of the teachings above and the claims below, and are intended to be within the spirit and scope of the invention.

What is claimed is:

1. A circuit for detecting and correcting transmitter LO leakage in a system having a transmitter and a receiver, the circuit comprising:
   a coupling unit configured to:
      receive a transmit signal from an output of an up-converter of the transmitter,
      in a first mode of operation, generate a first coupled signal based on an non-inverted version of the transmit signal, and
      in a second mode of operation, invert the transmit signal and generate a second coupled signal based on an inverted version of the transmit signal;
   a down-converter configured to down-convert the first coupled signal and the second coupled signal; and
   an estimation and correction unit configured to:
      measure a first DC offset for the down-converted first coupled signal,
      measure a second DC offset for the down-converted second coupled signal,
      estimate the transmitter LO leakage based on a difference between the first DC offset and the second DC offset; and
      apply a correction to the transmit signal based on the estimation,
   wherein the estimation and correction unit is configured to use a channel correlator to estimate the transmitter LO leakage.

2. The circuit according to claim 1, wherein the coupling unit is capable of electrically connecting and disconnecting the transmitter and the receiver from each other, for correcting the transmitter LO leakage.

3. The circuit according to claim 1, wherein a gain of the coupling unit is selectable and changeable.

4. The circuit according to claim 1, wherein the coupling unit includes:
   at least one of: a first buffer and a first switch, coupled to the output of the transmitter and the input of the receiver; and
   at least one of: a second buffer and a second switch, coupled to the output of the transmitter and the input of the receiver.

5. The circuit according to claim 1, wherein the coupling unit includes:

a first sub-unit having an input coupled to the output of the transmitter and an output coupled to the input of the receiver;
a second sub-unit, having an input coupled to the output of the transmitter and an output coupled to the input of the receiver;
a third sub-unit, having an input coupled to the output of the transmitter and an output coupled to the input of the receiver; and
a fourth sub-unit, having an input coupled to the output of the transmitter and an output coupled to the input of the receiver;
wherein each of the first sub-unit, the second sub-unit, the third sub-unit, and the fourth sub-unit includes at least one of: a buffer and a switch.

6. The circuit according to claim 5, further comprising:
a first LO harmonic filter having an input coupled to the output of the first sub-unit and the output of the third sub-unit, and an output coupled to the input of the receiver; and
a second LO harmonic filter having an input coupled to the output of the second sub-unit and the output of the fourth sub-unit, and an output coupled to the input of the receiver;
wherein the first and second LO harmonic filters filter harmonics of a looped back transmit signal from the output of the transmitter.

7. The circuit according to claim 5, further comprising:
a first LO harmonic filter having an input coupled to the output of the transmitter, and an output coupled to the input of the first sub-unit and the input of the second sub-unit; and
a second LO harmonic filter having an input coupled to the output of the transmitter, and an output coupled to the input of the third sub-unit and the input of the fourth sub-unit.

8. The circuit according to claim 1, wherein the transmitter transmits a signal, and the output of the estimation and correction unit is combined with the signal of the transmitter prior to the transmitter's output of the signal.

9. The circuit according to claim 1, wherein the coupling unit is configured to perform LO harmonic rejection.

10. The circuit according to claim 9, wherein the transmitter further includes an LO harmonic rejection upconverter to perform the LO harmonic rejection.

11. The circuit according to claim 9, wherein the receiver further includes an LO harmonic rejection downconverter to perform the LO harmonic rejection.

12. The circuit according to claim 9, further comprising a filter coupled to an input of the coupling unit to perform the LO harmonic rejection.

13. The circuit according to claim 9, further comprising a filter coupled to an output of the coupling unit to perform the LO harmonic rejection.

14. The circuit according to claim 1, wherein the first mode of operation and the second mode of operation are performed sequentially.

15. The circuit according to claim 1, wherein the coupling unit is further configured to filter harmonics of the transmit signal from the first coupled signal and the second coupled signal.

16. The circuit according to claim 1, wherein the transmit signal is a baseband signal up-converted to a desired frequency for transmission.

17. The circuit according to claim 16, wherein the down-converted first coupled signal is the first coupled signal down-converted to a frequency of the baseband signal.

18. The circuit according to claim 1, wherein the up-converter comprises a pair of up-converting LOs provided within the transmitter and wherein the down-converter comprises a pair of down-converting LOs provided in signal paths between an output of the coupling unit and an input of the estimation and correction unit.

19. The circuit according to claim 1, wherein the channel correlator is configured to derive information indicative of a phase difference between the transmitter and the receiver, wherein the transmitter LO leakage is estimated based the phase difference.

20. A circuit for detecting and correcting transmitter LO leakage in a system having a transmitter and a receiver, the circuit comprising:
a coupling unit coupled to an output of the transmitter and an input of the receiver; and
an estimation and correction unit coupled to an input of the transmitter and an output of the receiver, the estimation and correction unit including:
a DC offset estimator coupled to the output of the receiver;
a resampler coupled to the output of the receiver after the DC offset estimator;
a delay computer coupled to the resampler;
a channel correlator coupled to the resampler;
at least one first-in-first-out buffer having an input coupled to the input of the transmitter, and an output coupled to the channel correlator;
a LO leakage compensation network coupled to the input of the transmitter after the at least one first-in-first out buffer; and
a LO leakage estimator coupled to the DC offset estimator, the delay computer, the channel correlator, the LO leakage compensation network, and the coupling unit.

21. The circuit according to claim 20, wherein:
the DC offset estimator is configured to estimate a DC offset for a signal received from the output of the receiver, the signal received from the output of the receiver being representative of the transmit signal transmitted by the transmitter,
the resampler is configured to sample the signal received from the output of the receiver at a resampling phase to generate a resampled signal,
the channel correlator is configured to correlate the resampled signal to determine a phase difference between the transmitter and the receiver.

22. The circuit according to claim 21, wherein the resampled signal is correlated based on the output of the at least one first-in-first-out buffer.

23. The circuit according to claim 21, wherein estimating the DC offset, sampling the signal received from the output of the receiver, and correlating the resampled signal is performed iteratively.

24. The circuit according to claim 21, the resampling phase is based on a delay set by the delay computer.

25. A method for detecting and correcting transmitter LO leakage in a system having a transmitter and a receiver, the method comprising:
estimating a DC offset for a signal received from an output of the receiver, wherein the signal received from the output of the receiver is representative of a transmit signal transmitted by the transmitter;
sampling the signal received from the output of the receiver at a resampling phase to generate a resampled signal;

correlating the resampled signal to determine a phase difference between the transmitter and the receiver;

determining leakage compensation values based on the phase difference and the DC offset; and applying a correction to a transmit signal based on the leakage compensation values.

26. The method according to claim 25, wherein the resampled signal is correlated based on an output of a first-in-first-out buffer having an input coupled to the input of the transmitter.

27. The method according to claim 25, wherein estimating the DC offset, sampling the signal received from the output of the receiver, correlating the resampled signal, determining the leakage compensation values, and applying the correction to the transmit signal is performed iteratively.

28. The method according to claim 25, wherein the resampling phase is based on a delay set by a delay computer.

29. An apparatus for detecting and correcting transmitter LO leakage in a system having a transmitter and a receiver, the apparatus comprising:

means for estimating a DC offset for a signal received from an output of the receiver, wherein the signal received from the output of the receiver is representative of a transmit signal transmitted by the transmitter;

means for sampling the signal received from the output of the receiver at a resampling phase to generate a resampled signal;

means for correlating the resampled signal to determine a phase difference between the transmitter and the receiver;

means for determining leakage compensation values based on the phase difference and the DC offset; and means for applying a correction to a transmit signal based on the leakage compensation values.

30. The apparatus according to claim 29, wherein estimating the DC offset, sampling the signal received from the output of the receiver, correlating the resampled signal, determining the leakage compensation values, and applying the correction to the transmit signal is performed iteratively.

* * * * *